US010051239B2

(12) United States Patent
Stanford-Clark et al.

(10) Patent No.: US 10,051,239 B2
(45) Date of Patent: Aug. 14, 2018

(54) PRODUCING SPECIAL EFFECTS TO COMPLEMENT DISPLAYED VIDEO INFORMATION

(75) Inventors: Andrew James Stanford-Clark, Isle of Wight (GB); Benjamin Joseph Fletcher, West Yorkshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1777 days.

(21) Appl. No.: 11/869,010

(22) Filed: Oct. 9, 2007

(65) Prior Publication Data
US 2008/0276291 A1 Nov. 6, 2008

(30) Foreign Application Priority Data
Oct. 10, 2006 (EP) ..................... 0619972

(51) Int. Cl.
| | |
|---|---|
| *G06F 3/00* | (2006.01) |
| *G06F 13/00* | (2006.01) |
| *H04N 5/445* | (2011.01) |
| *H04N 7/16* | (2011.01) |
| *H04N 7/173* | (2011.01) |
| *H04N 21/222* | (2011.01) |
| *H04N 21/266* | (2011.01) |
| *H04N 21/2665* | (2011.01) |
| *H04N 21/2668* | (2011.01) |
| *H04N 21/472* | (2011.01) |
| *H04N 21/4722* | (2011.01) |

(Continued)

(52) U.S. Cl.
CPC ...... *H04N 7/17354* (2013.01); *H04N 7/17318* (2013.01); *H04N 21/222* (2013.01); *H04N 21/2665* (2013.01); *H04N 21/2668* (2013.01); *H04N 21/26616* (2013.01); *H04N 21/4722* (2013.01); *H04N 21/47202* (2013.01); *H04N 21/47208* (2013.01); *H04N 21/8133* (2013.01); *H04N 21/8453* (2013.01)

(58) Field of Classification Search
None
See application file for complete search history.

(56) References Cited

U.S. PATENT DOCUMENTS

| | | |
|---|---|---|
| 5,485,221 A | 1/1996 | Banker et al. |
| 5,887,243 A | 3/1999 | Harvey et al. |
| 6,307,939 B1 | 10/2001 | Vigarie |

(Continued)

*Primary Examiner* — Kyu Chae
(74) *Attorney, Agent, or Firm* — Fabian VanCott; Steven L. Nichols

(57) ABSTRACT

A hierarchical publish/subscribe network is employed to produce and distribute special effects to users to complement displayed video information. A top level broker in the network receives a plurality of data streams corresponding to a respective plurality of primary special. A service provider makes a subscription request for one of said primary special effects and receives the corresponding selected data stream. The selected data stream is transformed into at least one further data stream, corresponding to a further special effect. The further data stream is published to a lower level broker associated with the service provider. In response to a user subscription request for the further special effect, the lower level broker publishes the further data stream to a user interface for presentation to the user in association with the displayed video information.

1 Claim, 3 Drawing Sheets

(51) Int. Cl.
*H04N 21/81* (2011.01)
*H04N 21/845* (2011.01)

(56) References Cited

U.S. PATENT DOCUMENTS

| | | | |
|---|---|---|---|
| 6,510,557 | B1 | 1/2003 | Thrift |
| 2002/0083453 | A1* | 6/2002 | Menez ........................... 725/47 |
| 2003/0088613 | A1* | 5/2003 | Goldschmidt Iki et al. . 709/202 |
| 2003/0169366 | A1* | 9/2003 | Lenzi et al. .................. 348/461 |
| 2004/0008277 | A1* | 1/2004 | Nagaishi et al. ............. 348/468 |
| 2004/0064431 | A1* | 4/2004 | Dorner et al. .................... 707/1 |
| 2005/0108026 | A1 | 5/2005 | Brierre et al. |
| 2005/0108418 | A1* | 5/2005 | Bedi et al. .................... 709/232 |
| 2005/0210511 | A1* | 9/2005 | Pettinato ........................ 725/61 |
| 2006/0031114 | A1* | 2/2006 | Zommers ........................ 705/10 |
| 2006/0047742 | A1* | 3/2006 | O'Neill .................. H04L 49/25 |
| | | | 709/203 |
| 2006/0190250 | A1* | 8/2006 | Saindon et al. ............. 704/235 |
| 2007/0162944 | A1* | 7/2007 | Khare et al. ................. 725/113 |
| 2007/0168420 | A1* | 7/2007 | Morris .......................... 709/204 |
| 2007/0280381 | A1* | 12/2007 | Amini et al. ................. 375/340 |
| 2008/0066138 | A1* | 3/2008 | Bishop et al. ................ 725/137 |
| 2008/0088735 | A1* | 4/2008 | Biniak et al. ................. 348/468 |
| 2008/0256553 | A1* | 10/2008 | Cullen .......................... 719/313 |

\* cited by examiner

PRODUCING SPECIAL EFFECTS TO COMPLEMENT DISPLAYED VIDEO INFORMATION

BACKGROUND OF THE INVENTION

The present invention relates to producing special effects to complement displayed video information and, in particular, to the use of Publish/Subscribe technology to distribute special effects to users.

A "Publish/Subscribe" system is a type of messaging application in which the providers of information (publishers) are decoupled from the consumers of that information (subscribers) by means of a broker. Typically, in such a system, a number of publishers publish messages to a broker on particular topics (e.g. news, weather, sport). Subscribers register their interest in such topics via subscription requests received at the broker. For example, a subscriber may request to receive any information published on the weather, while another subscriber may desire information on the news and sports. Publishers are not concerned with where their publications are going, and subscribers are not interested in where the messages they receive come from. Instead, the broker manages the distribution of the messages to make sure that they arrive at the correct destination according to valid subscriptions registered in the broker. A broker may also ensure that messages are distributed in the correct format and may also validate the authority of each publisher to publish to the subscribers which have subscribed to the particular topic on which the message is published.

In general terms, a publisher generates a message that it wants to publish and defines the topic of the message. The broker receives the message from the publisher and distributes a copy of the message to all subscribers that have registered an interest in that topic. Distribution of messages to subscribers may be either by point-to-point broadcast from the broker or by multi-casting. In the latter case, in order to reduce network traffic, messages on particular topics are distributed to intermediate shared addresses which are provided to all the subscribers that have registered an interest in the particular topic so that they can listen for newly published information.

A "topic" may be any character string that describes the nature of the data that is published in a publish/subscribe system. Topics are key to the successful delivery of messages. Instead of including a specific destination address in each message, a publisher assigns a topic to the message. The broker matches the topic with a list of clients (subscribers) who have subscribed to that topic and delivers the message to each of those clients. Topics can be defined by a system administrator in advance but can also be defined dynamically when specified in a publication for the first time.

Some message brokers include transformation engines at internal nodes that can transform a message into another form, for example, conversion of currencies for financial data. This relieves the end users from having to convert the message into a different format themselves. Additionally, customized transformations can be written by a user and applied externally of the broker. The topic message is transformed at the user application and republished back to the message broker, from where it can be sent on to subscribers to the transformed messages.

In the different field of television broadcasting and cinema film projection, a common ancillary feature is the provision of subtitles to accompany the main program or movie. A principal purpose is to provide a translation into a different language from the audio track or to provide same language subtitles for viewers with impaired hearing. Also known in current live television broadcasting is the use of captioning whereby further information relevant to the main program is either provided as a semi-static feature, for example giving a current game score, or is scrolled along the bottom of the screen to complement the main program content.

Subtitling and captioning are special effects provided directly by the broadcaster or movie maker. In the case of movie subtitling and so-called closed captioning for television, this may be outside the control of the viewer, who may not be able to select it or turn it off. Television subtitling, however, is normally provided by means of teletext and can be enabled by the viewer selecting the appropriate teletext channel.

US patent application publication 2005/0108026 A1 "Personalized Subtitle System" to Brierre et al. shows a user controllable subtitle facility for use in conjunction with a cinema film show, in which subtitles or captions are viewed through a heads-up display at the same time as the main film. Although primarily developed for a cinema audience, the possibility of using such a system for home DVD players or even live TV programs is mentioned. The subtitles are provided from a data base populated by publishers, aggregators or individuals and are provided by a central personal subtitle server to a controller for both the server and the heads-up display. The controller allows the user to switch the heads-up display on or off and to select different aspects of the subtitle, such as language, size, color, font and position. The possibility of personalized subtitle system controllers registering to receive only a group of subtitle packets at a particular group address is also mentioned without being explored further.

BRIEF SUMMARY OF THE INVENTION

The invention may be embodied as a method of distributing special effects to users to complement displayed video information. A top level broker in a hierarchical publish/subscribe network receives data streams corresponding to primary special effects and provides selected data streams to service providers in response to subscription requests received from those service providers. The service providers may further modify the received data streams and publish them to an associated lower level service provider. The lower level broker responds to a user subscription request by providing the further modified data streams to a user interface for presentation in association with displayed video information.

The invention may also be embodied as a hierarchical publish/subscribe computer network for providing special effects to complement displayed video information provided by a primary content provider. The network includes a top level broker that receives several data streams from a primary content provider and published those data streams to a network. Each of the data streams corresponds to a primary special effect. A service provider (including a lower level broker) in the network receives, as a response to a subscription request to the top level broker, one of the selected data streams and transforms that data stream into a further data stream that, in response to a user subscription request, provides the further data stream to a user interface for presentation in association with displayed video information.

Finally, the invention may be embodied as a computer program product for providing special effects to users for display in association with displayed video information. The computer program product includes a computer usable medium embodying computer usable program code that is configured to cause a plurality of data streams corresponding to primary special effects to be received at a top level broker and to provide the data streams to service providers in response to subscription requests received from the service providers. The program product further includes program code that may be executed at the service provider to transform a selected data stream into a further-modified form as well as program code configured to receive user subscription requests for the further-modified data stream and to provide the further-modified data stream to a user interface for presentation in association with displayed video information.

DETAILED DESCRIPTION OF THE INVENTION

Figure 1:
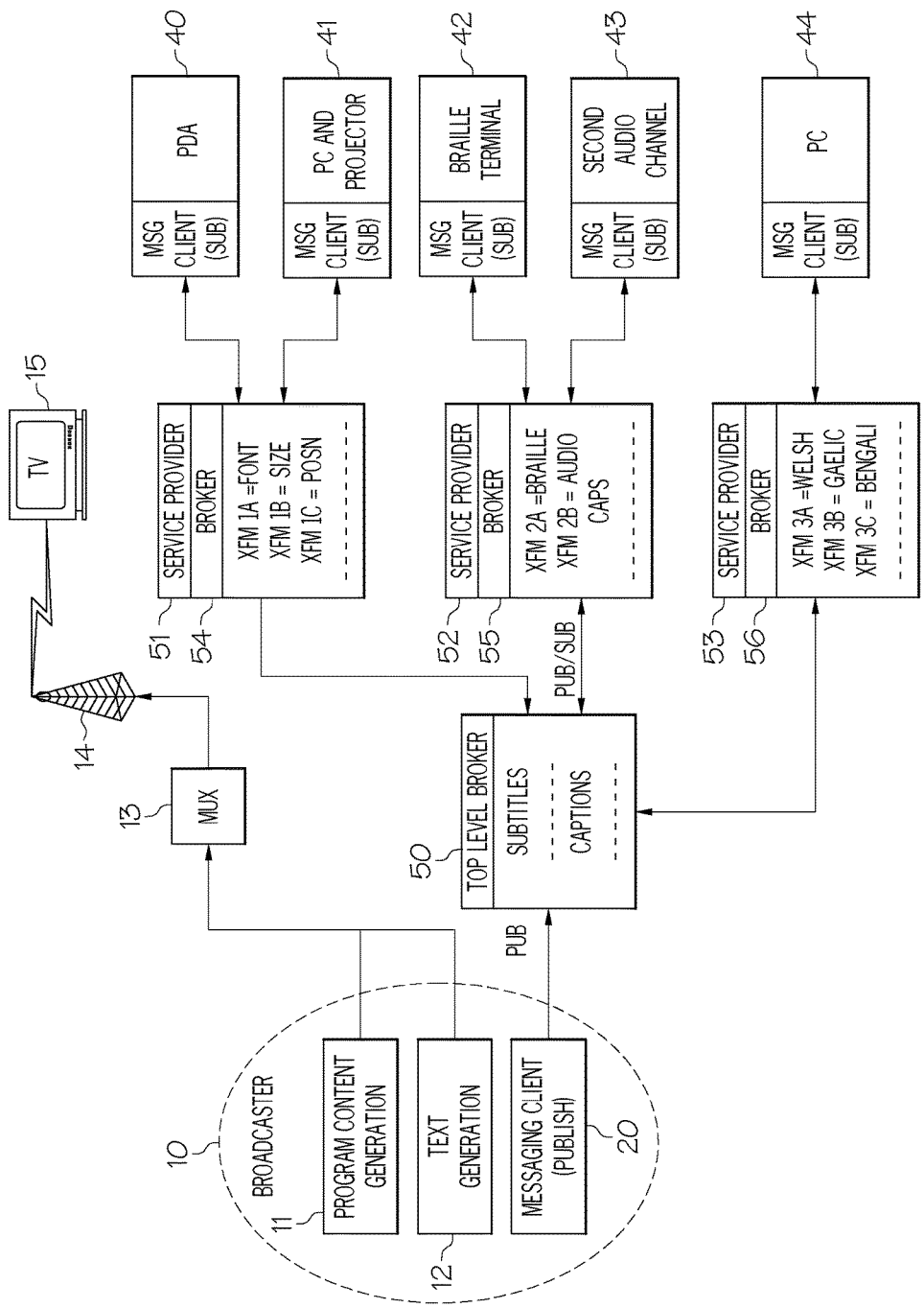
FIG. 1 shows a broadcasting network including a publish/subscribe system according to the present invention for producing special effects to complement displayed video information received from a content provider

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the broadcasting network illustrated in FIG. 1, a television broadcaster 10 combines conventional program content and text generation components 11 and 12 with a messaging client 20. Text information typically includes subtitle and captioning information to enhance the material being broadcast by the television station by giving additional context or interpretive meaning to what is happening on the screen at a given time. Subtitles are typically used to assist the hearing impaired or to provide dialogue in another language from the audio channel. Captions may, for example, be semi-static information, such as statistical information displayed to complement a currently broadcast sporting event, or may be continuously scrolling alternative text displayed concurrently with a news program. Both are effectively special effects complementing the displayed video information.

Taking subtitles as an example, subtitles are typically typed in by stenographers during a live broadcast. The subtitle text entered into a computer, including text generation component 12, is sent to a multiplexing device 13 that combines it with the transmitted television video signal in a teletext page. The subtitles can then be displayed on a normal television set 15 by the viewer selecting the appropriate teletext page.

In the implementation of the present invention, the same computer that generates the text for transmission via teletext is modified by the addition of messaging client 20. A copy of each piece of text that is separately generated is published to a hierarchical publish/subscribe network. The publish/subscribe network (described further below) transforms the text information in various ways and republishes it to appropriate user interface devices 40-44 for presentation of the transformed information as further special effects.

A preferred implementation of the network may use WebSphere Message Broker product from IBM. The implementation comprises client applications, which can be publishers and/or subscribers, and brokers. A broker is a piece of software running on a server, which implements the publish/subscribe message distribution pattern. In this context, "a broker" may also be used to refer to a plurality of brokers at a single location, working collaboratively to provide the same logical service as a single physical broker. A collaborative arrangement may be used for reasons of high availability or scalability to large numbers of connected clients, or both.

In the illustrated configuration, the messaging client 20 publishes its information to a top level message broker 50. This will normally be owned by the broadcaster and may be directly connected to the messaging client or may use an internet (TCP/IP) connection and employ a known communications protocol such as the IBM MQ Telemetry Transport protocol ("MQTT"). This protocol is a lightweight publish/subscribe protocol flowing over TCP/IP designed for small remote devices and appliances, and making efficient use of available communications bandwidth.

Each publication is tagged with a topic, which describes what the message is about, with reference to an information hierarchy or topic tree. Typically this topic would be used to identify the "channel" of information to which the message relates, for example, the television channel, and the "type" of supplementary information (subtitle, caption, sound effect, emotion, actor movements, etc). This topic enables subscribers to be specific about the type of information they wish to receive from the top level broker when a publisher sends information of that kind to the broker. In FIG. 1, only subtitles and captions are shown, there being one topic for every TV channel offering each type of complementary information.

The top level broker 50 republishes the messages it receives to any of a number of subscribing downstream service providers 51, 52 and 53, each of which includes a lower level message broker 54, 55 and 56 respectively and transformation software comprising one or more transformation applications. Although not shown specifically in FIG. 1 (but illustrated in FIG. 2 below), collocated with each service provider, there is messaging client software to subscribe to topics of interest from the next broker higher in the hierarchy. This functionality is part of the transformation software but may, alternatively, be included as a component of the lower level message broker.

The service providers are, in this example, independent but could also be part of a larger broadcaster owned system. The service providers 51-53 receive the raw subtitle or caption data, manipulate and transform it in some way, and then send it via their respective brokers to a number of down-stream recipients who wish to receive the information in a certain format. In addition to effecting the transformation, each of the transformation applications is a publishing client to the local lower level broker. The service providers subscribe to the particular topics of information in the top level broker that they are interested in.

The transformation applications each provide one or more custom transformations of the raw data. When a message arrives from the top level broker that matches its subscription, the receiving application at the service provider transforms the data, for example, by modifying it with a special effect and converting it into a format that is able to be rendered by a specific type of output device with which that service provider has some interest or association The transforming application then publishes the modified content to its local broker, which then distributes copies of the modified content to subscribers who are interested in that version of the content.

In the examples illustrated in FIG. 1, service provider 51 offers transformations of the text font (Xfm 1A), size (Xfm 1B) and position (Xfm 1C). The transformed text may be viewed, in this example, on a Personal Digital Assistant 40 or on a PC and projector combination 41.

Service provider 52 offers transformations for the visually handicapped. Thus transformation 2A is capable of being rendered on a Braille output terminal. Transformation 2B provides an input to a speech synthesizer to allow captioning information to be rendered for output on an audio channel, such as a separate speaker'

Finally, service provider 53 offers translations of subtitling into different languages. Thus transformation 3A provides Welsh, transformation 3B provides Gaelic and transformation 3C provides Bengali subtitles or captions.

Figure 2:
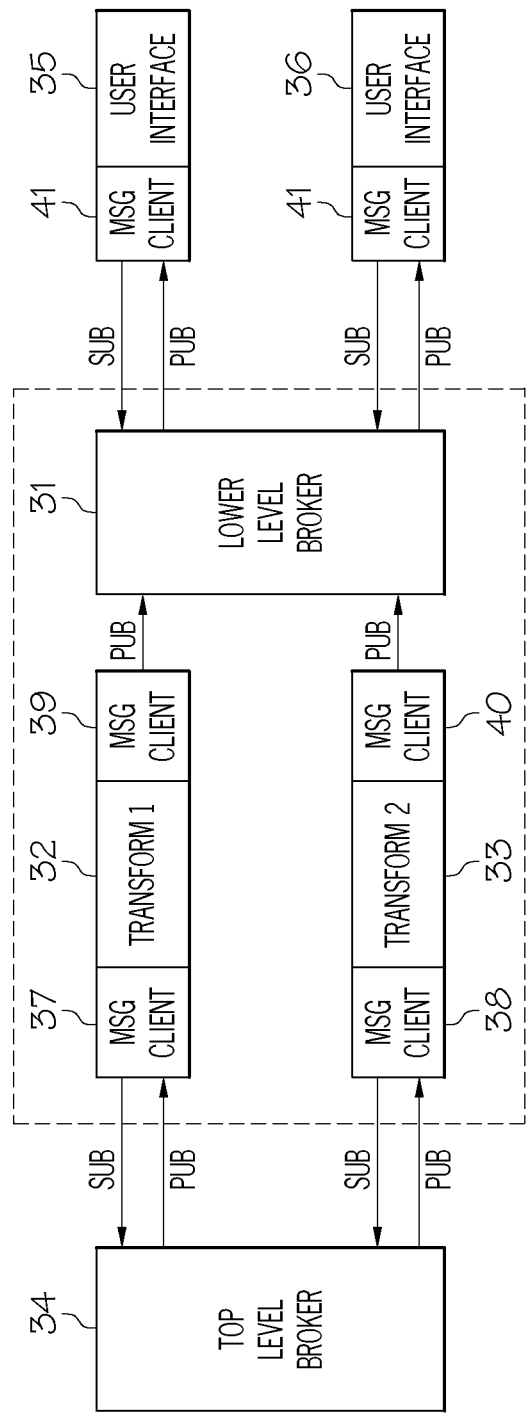
FIG. 2 shows further detail of the configuration of a message broker employed in the network of FIG. 1.

In FIG. 1, for ease of illustration, the transformation applications are only shown as lists headed "Xfm . . . ". However, in practice, the transformation engines are customized separate units of application software which communicate with their respective broker via a publish/subscribe connection, as illustrated in FIG. 2, below. Alternatively, they may be incorporated as part of the broker function.

FIG. 2, shows an example for a typical service provider 30 consisting of a lower level broker 31 and two transformation applications 32 and 33. Also shown are a top level broker 34 and two user interfaces 35 and 36. The transformation applications 32 and 33 subscribe via messaging clients 37 and 38 to the top level broker 34 for topics (special effects) whose associated data streams they are designed to transform. The appropriate messages, each including the topic identifier and a data packet forming part of the data stream are published back to the messaging clients by the top level broker. There they are transformed by applications 32 and 33 into data streams representing further special effects.

These are assigned appropriate new topic names for the further effects and the combined messages (topic and packet) are published by messaging clients 39 and 40 to the network, including lower level broker 31. It will be realized that, in reality, messaging clients 37 and 39 are not separate but are part of a single messaging client, as are 38 and 40.

At the user interfaces 35 and 36, user inputs are converted into subscription requests for the further special effects and these are supplied by further messaging clients 41 and 42 to the lower level broker 31. In response, the lower level broker routes the appropriate transformed data streams to the user interfaces, where they are converted for presentation on the appropriate user device.

As an alternative to the arrangement described in FIG. 2, there could be an application collocated with the service provider's broker, which is a subscriber to the top level broker, and which upon receiving a message, simply republishes it to the local broker. From there, one or more transforming applications may subscribe to the local broker to receive the messages, transform them, and republish them back to the local broker (on a different topic) for distribution to the downstream subscribers. Note that this collocated application may be a component of the message broker itself.

Thus, having transformed the data, the application publishes the modified data to its associated lower level broker—typically located at the service provider. This broker (or collection of brokers behaving as if one broker) receives the published data from the transforming application, and makes it available to any interested subscribers.

This combination of subscribing application, information transformation, and republishing to another broker may happen a number of times, since a service provider may wish to derive an alternative form from an already transformed piece of information. Thus a hierarchy of service providers, each with their own broker and subscribing application, is constructed.

User devices are at the leaf nodes of this tree of brokers. These are able to render content in a very specific way, and require data to be fed to them in a specific format. This format must be one that is produced by one or more of the service providers in the network. The device is configured to connect to a particular broker (typically using a DNS name to provide flexibility for the service provider to be able to provide a scalable and highly available service). The device is further configured to subscribe to a certain topic (or set of topics) on the broker to which it connects at the service provider. This registers the device for certain types of data that have been transformed in some way from the original source published by the television broadcast station.

Figure 3:
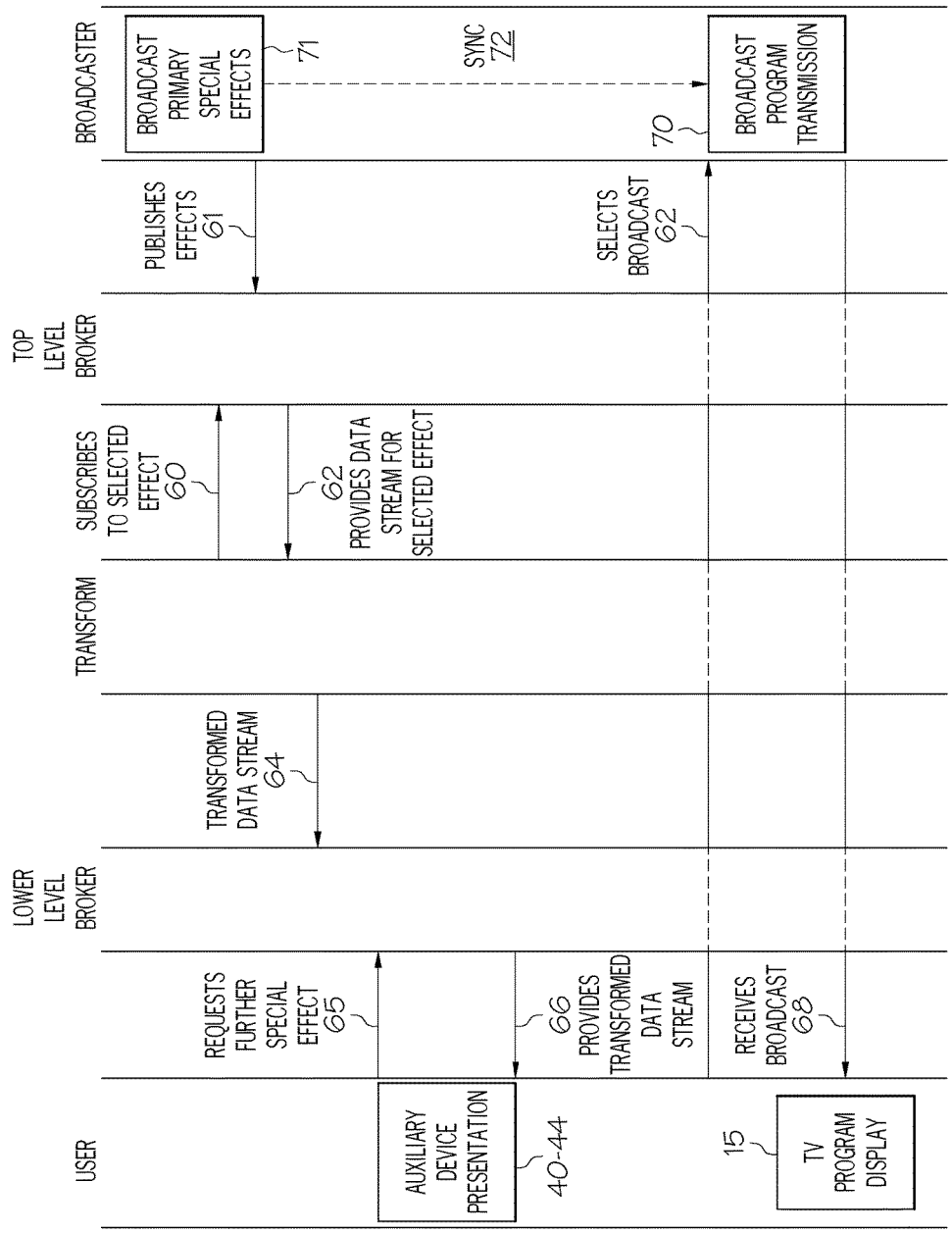
FIG. 3 is a sequence diagram of a method of producing special effects to complement displayed video information according to the invention employing a publish/subscribe network as shown in FIG. 1

The sequence of events is an end-to-end chain and is best illustrated in the sequence diagram of FIG. 3. It is assumed that a broadcaster, equivalent to broadcaster 10 in FIG. 1, creates primary special effects in the form of data streams. These data streams are made available to the top level broker (50 in FIG. 1) as messages. A message might, for example, be a subtitle generated on a captioning computer. In response to a subscription request (step 60) from a transformation application (such as applications 32 or 33, FIG. 2) associated with a particular service provider (such as 30 in FIG. 2) for a specific primary special effect, such as subtitles broadcast on a particular TV channel, any relevant messages subsequently published by the broadcaster in step 61 are selected by the top level broker. From there, they are routed (step 62) to the requesting transformation application.

The selected message data is input to the transformation application which applies its transformation to the data and republishes it (step 64) to its local broker. It is desirable and usual, though not essential, to publish the transformed data on a different topic from the raw data, to differentiate it from the raw data stream. However, this is not essential, as the data is published to a different broker than that to which the raw data is published, so there will not be an actual conflict. Another service provider could optionally also have a subscription to the data from the first service provider, and could again transform the data and republish it to its own local broker.

User devices at the "edge" of the network connect into one particular broker (or set of brokers) at a service provider, and subscribe (step 65) to certain data topics in order to create a desired special effect. When a piece of transformed data is published to the particular broker or set of brokers on one of those topics of interest, the device receives the data (step 66). The device then renders that data in a device-specific way, and makes the information available to the auxiliary presentation devices 40-44. Thus the original subtitle (or other piece of enhancing information) is, via a number of transformations and intermediate brokers and finally a subscribing device, conveyed to the end user in some form.

Also illustrated in FIG. 3, is the basic viewing operation of selecting a TV channel (step 67) and receiving the broadcast video (step 68). Synchronization between the broadcast program transmission function 70 and the special effects broadcasting function 71 is indicated by a connection 72 but, as has been noted, is not absolutely necessary in all cases.

It is to be noted that low latency and timeliness of data delivery are very important to the successful operation of this end-to-end system. Subtitles usually refer very specifically to the scene that is currently being shown, and the words that are being spoken at that time. Hence it is highly desirable for the message passing, processing by the brokers, and transformations to take as little time as possible, to reduce the overall latency.

A typical messaging system, such as IBM's WebSphere MQ product, or a system employing the MQ Telemetry Transport protocol, is able to hold messages in queues, awaiting delivery at a later time when the network path is available. As long as the queues along the path are empty, then no significant latency will be added to the delivery of the messages by the messaging system.

If a network connection goes down, then messaging systems normally store messages in a queue, awaiting the time when the link is restored and data can be delivered as previously intended. This is not likely to be acceptable for a system which offers enhancement to a live television broadcast. Queued data delivered after the scene to which it is relevant is of no use to a viewer and may, if presented, seriously confuse the viewer.

For this reason, use of a "non-persistent" messaging mode of the delivery protocol, as for example, provided by MQ Telemetry Transport is required. In a "non-persistent" messaging mode, if a connection is down and data cannot be delivered to a particular subscriber without being queued, then that data is discarded rather than queued. When the link is restored, the next piece of data to be published will be the first one across the restored link. This approach ensures that the data is always as up to date as possible, and backlogs due to network failures are not introduced.

Scalability is also a potential concern. Every device that wishes to receive a certain data stream must connect to a broker that hosts that topic, and maintain a connection to it in order to receive data (assuming a TCP/IP-based connection-orientated protocol). A common technique is for a number of brokers at a particular service provider to subscribe to the main broker of the service provider, and by using load-balancing software (well known in the art) distribute the incoming connections across several brokers.

Each broker receives an identical feed, and sends it out to each of its subscribers. Thus a number of brokers are able to act as if there were just one very powerful broker present.

Although the described implementation requires separate user devices in order to present the special effects, in a modification of the above system, it is possible to display visual and auditory effects on the user's television. This is achieved by arranging for the special effects received by the lower level broker from the relevant transformation engines to be published back to the top level broker at the broadcaster. There, they may be transmitted using the broadcaster's established teletext system. This could be of use to broadcasters who might wish to subcontract the provision of certain further special effects to external service providers while still wishing to distribute them directly to viewers.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of providing subtitle or captioning data to viewers of a video program, the method comprising:
   at a video source, storing video program content and corresponding text, transmitting the video program content to a viewer;
   in addition to transmitting the video program content to a viewer, providing the corresponding text, comprising subtitles or captioning for the video program content, to a messaging client of a publish/subscribe system;
   accessing the publish/subscribe system to publish the corresponding text by, with the messaging client, transmitting the corresponding text to a top level broker of the publish/subscribe system for distribution via the top level broker and at least one mid-level broker to a number of subscribers in the publish/subscribe system; and,
   with the at least one mid-level broker, accessing a service provider, where the mid-level broker transmits the corresponding text to the service provider and receives back a different version of the corresponding text from the service provider for distribution by the mid-level broker to a number of subscribers in the publish/subscribe system.

* * * * *